US008705818B2

(12) United States Patent  (10) Patent No.: US 8,705,818 B2
Kanda (45) Date of Patent: Apr. 22, 2014

(54) IMAGE PROCESSING DEVICE, COMPUTER READABLE STORAGE MEDIUM STORING IMAGE PROCESSING PROGRAM, AND IMAGE PROCESSING METHOD

(75) Inventor: Yamato Kanda, Tokyo (JP)

(73) Assignee: Olympus Corporation, Tokyo (JP)

( * ) Notice: Subject to any disclaimer, the term of this patent is extended or adjusted under 35 U.S.C. 154(b) by 636 days.

(21) Appl. No.: 12/613,036

(22) Filed: Nov. 5, 2009

(65) Prior Publication Data

US 2010/0124365 A1 May 20, 2010

(30) Foreign Application Priority Data

Nov. 14, 2008 (JP) ................................. 2008-292096

(51) Int. Cl.
 *G06K 9/00* (2006.01)
 *A61B 1/06* (2006.01)
 *A61B 1/04* (2006.01)

(52) U.S. Cl.
 USPC ............................................. 382/128; 705/3

(58) Field of Classification Search
 USPC ....................................................... 382/128
 See application file for complete search history.

(56) References Cited

U.S. PATENT DOCUMENTS

| 8,000,776 B2 * | 8/2011 | Gono ............................ 600/476 |
| 2003/0030722 A1 * | 2/2003 | Ozawa et al. .................... 348/71 |
| 2007/0191677 A1 * | 8/2007 | Nishimura et al. ........... 600/109 |

FOREIGN PATENT DOCUMENTS

| JP | 2006-122502 | 5/2006 |
| JP | 2006-288878 | 10/2006 |
| WO | 2006/129430 A1 | 12/2006 |
| WO | WO 2007/119297 A1 | 10/2007 |

OTHER PUBLICATIONS

Japanese Official Action dated Jun. 4, 2013 from related application JP 2008-292096 together with an English language translation.
Japanese Official Action dated Dec. 11, 2012 from related application JP 2008-292096 together with an English language translation.

* cited by examiner

*Primary Examiner* — Hiep V Nguyen
(74) *Attorney, Agent, or Firm* — Scully, Scott, Murphy & Presser, PC

(57) ABSTRACT

An image processing device includes a feature value calculating unit that calculates a color feature value of each pixel or each segment inside at least one of a series of images captured by an image pickup device while moving inside a gastrointestinal tract; a color feature value estimating unit that, based on data distribution of the color feature value of each pixel or each segment, estimates color feature value data representing mucous membrane and color feature value data representing gastrointestinal contents; and a discrimination boundary setting unit that, based on the estimated color feature value data, sets a color feature value discrimination boundary between mucous membrane and gastrointestinal contents.

12 Claims, 7 Drawing Sheets

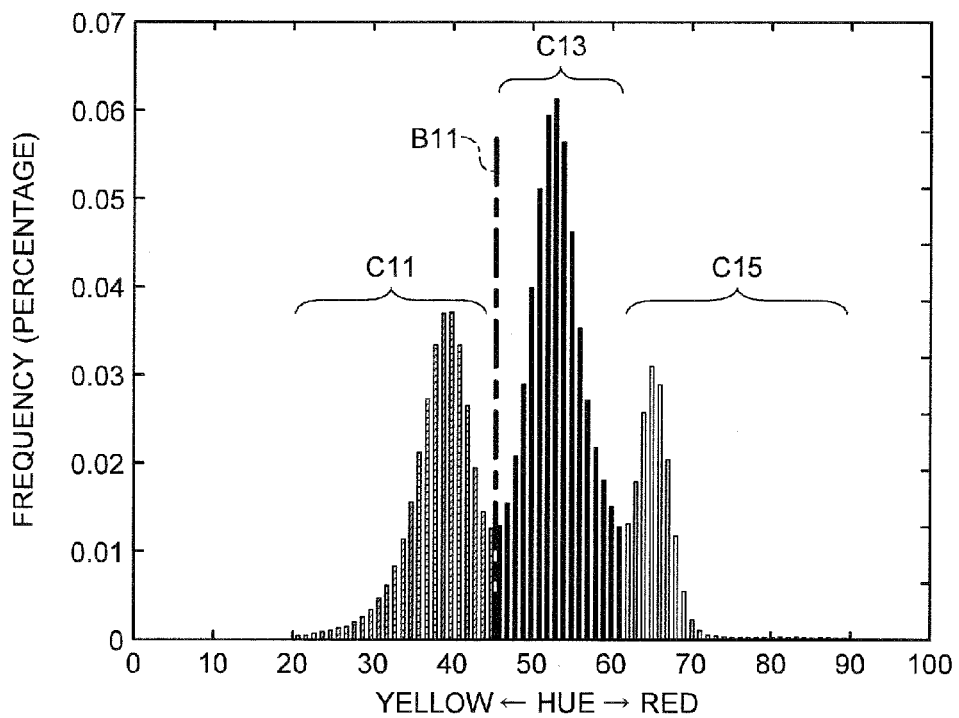
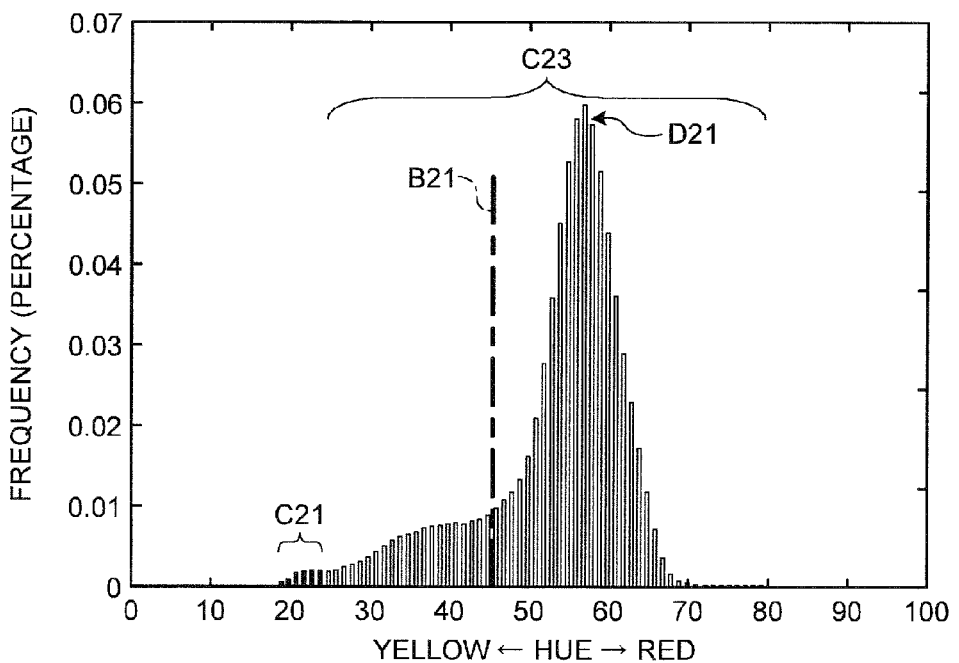

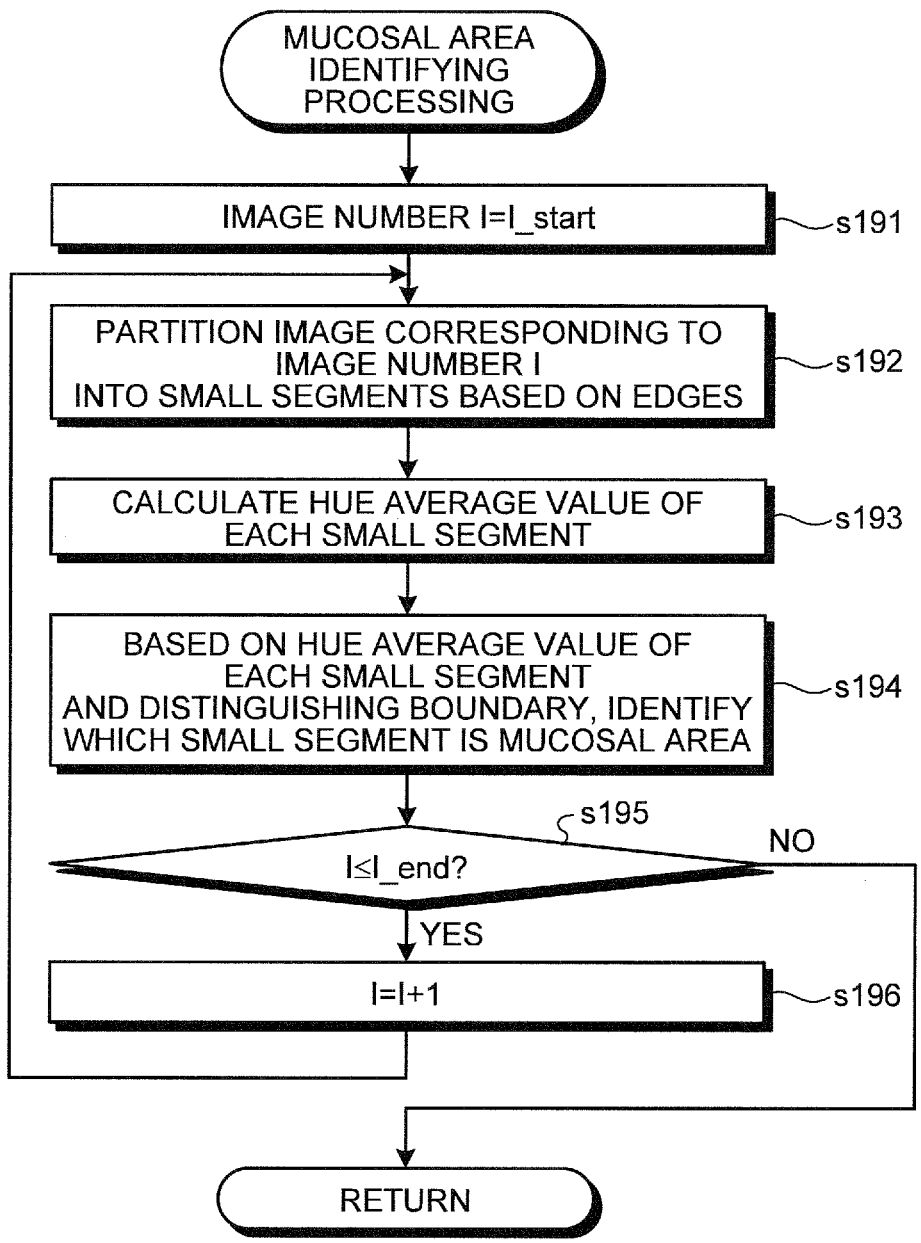

IMAGE PROCESSING DEVICE, COMPUTER READABLE STORAGE MEDIUM STORING IMAGE PROCESSING PROGRAM, AND IMAGE PROCESSING METHOD

CROSS-REFERENCE TO RELATED APPLICATIONS

This application is based upon and claims the benefit of priority from Japanese Patent Application No. 2008-292096, filed on Nov. 14, 2008, the entire contents of which are incorporated herein by reference.

BACKGROUND OF THE INVENTION

1. Field of the Invention

The present invention relates to an image processing device, a computer readable storage medium storing an image processing program, and an image processing method that are used in processing a series of intra-gastrointestinal-tract images captured by an image pickup device while moving inside a gastrointestinal tract.

2. Description of the Related Art

An image pickup device such as a capsule endoscope that can capture a series of intra-gastrointestinal-tract images while moving inside a gastrointestinal tract has been developed in recent years. Upon being swallowed from mouth and while being carried through the gastrointestinal tract due to the peristaltic motion, a capsule endoscope sequentially captures images at a predetermined image capturing rate and transmits the images to an external receiving apparatus. Eventually, the capsule endoscope is passed out of the body. Broadly, the number of captured intra-gastrointestinal-tract images is indicated by an image capturing rate of "(about 2 to 4 frames/sec)×length of stay in body (about 8 hours=8×60× 60 sec)", which comes to several tens of thousands of images. Thus, to confirm that large number of images on a diagnostic workstation or the like, a doctor needs to spend a considerable amount of time. For this reason, there is a strong demand for a technology that would streamline the image confirmation task performed by a doctor.

For example, Japanese Patent Application Laid-open No. 2006-122502 discloses a technology that distinguishes, from among a large number of intra-gastrointestinal-tract images captured by a capsule endoscope, images including a mucosal area or a gastrointestinal contents area of gastrointestinal contents such as feces so that unwanted images such as images including almost no mucous membrane can be deselected. More particularly, each pixel in an image is mapped to a feature space (arctan (g/r), arctan (b/r), etc.) that is based on the color information of that pixel. Then, by performing comparison with a distribution range within a feature space of the previously obtained pixels belonging to the mucosal area or the gastrointestinal contents area (teaching data), it is determined to which area range each pixel in the image belongs and then the mucosal area or the like is identified.

SUMMARY OF THE INVENTION

An image processing device according to an aspect of the present invention includes a feature value calculating unit that calculates a color feature value of each pixel or each segment inside at least one of a series of images captured by an image pickup device while moving inside a gastrointestinal tract; a color feature value estimating unit that, based on data distribution of the color feature value of each pixel or each segment, estimates color feature value data representing mucous membrane and color feature value data representing gastrointestinal contents; and a discrimination boundary setting unit that, based on the estimated color feature value data, sets a color feature value discrimination boundary between mucous membrane and gastrointestinal contents.

A computer readable storage medium according to another aspect of the present invention has stored therein an image processing program including instructions. The instructions cause a computer to execute: calculating a color feature value of each pixel or each segment inside at least one of a series of images captured by an image pickup device while moving inside a gastrointestinal tract; estimating, based on data distribution of the color feature value of each pixel or each segment, color feature value data representing mucous membrane and color feature value data representing gastrointestinal contents; and setting, based on the estimated color feature value data, a color feature value discrimination boundary between mucous membrane and gastrointestinal contents.

An image processing method according to still another aspect of the present invention includes calculating a color feature value of each pixel or each segment inside at least one of a series of images captured by an image pickup device while moving inside a gastrointestinal tract; estimating, based on data distribution of the color feature value of each pixel or each segment, color feature value data representing mucous membrane and color feature value data representing gastrointestinal contents; and setting, based on estimated color feature value data, a color feature value discrimination boundary between mucous membrane and gastrointestinal contents.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a graph representing a result of clustering performed with respect to the histogram illustrated in FIG. 5;

FIG. 8 is a graph of an exemplary histogram determined to have a low bimodal; and FIG. 9 is a flowchart for explaining a detailed sequence of operations in mucosal area identifying processing.

DETAILED DESCRIPTION OF THE PREFERRED EMBODIMENTS

Figure 1:
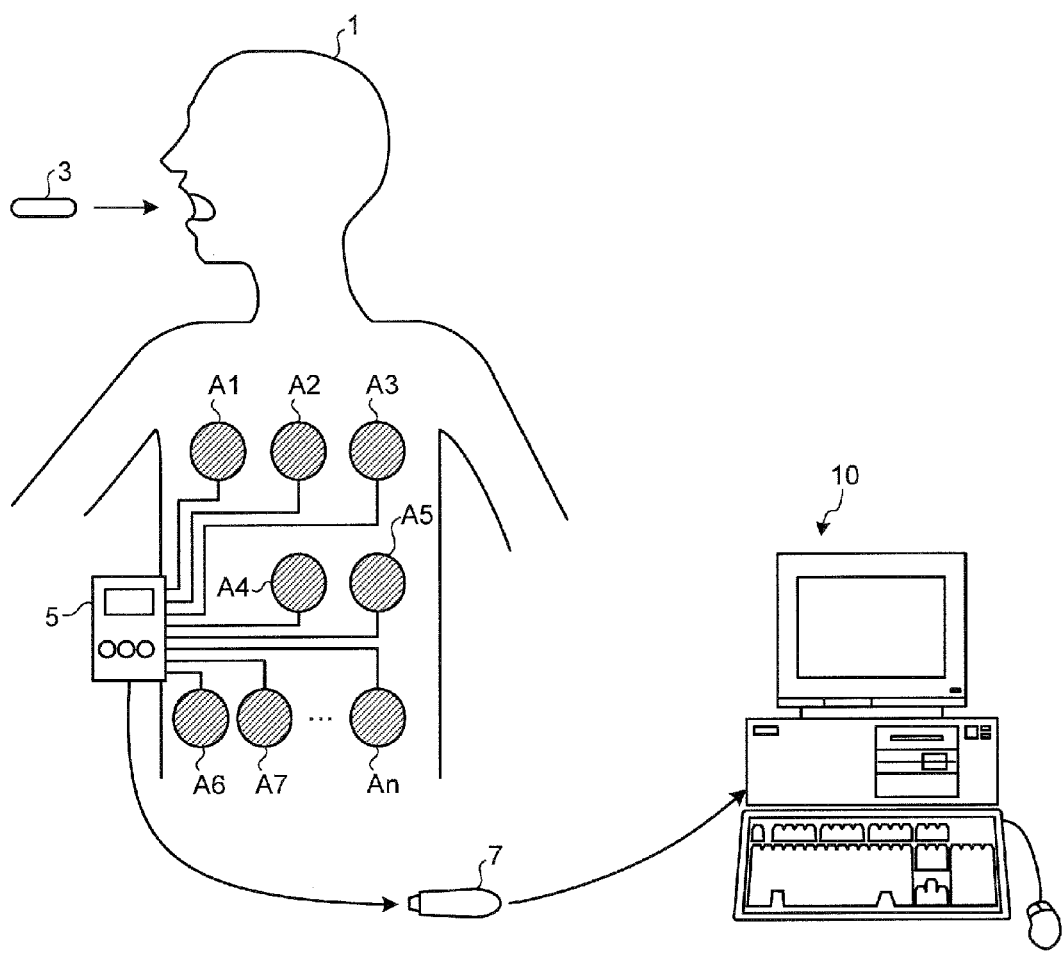
FIG. 1 is a schematic diagram of an overall configuration of an image processing system including an image processing device.

An exemplary embodiment according to the present invention will be described below in detail with reference to the accompanying drawings. In the present embodiment, an image pickup device is assumed to be a capsule endoscope that can move inside a gastrointestinal tract. The following description is given about an image processing device that processes a series of intra-gastrointestinal-tract images captured by the capsule endoscope while moving inside the gastrointestinal tract of a test subject. Meanwhile, the present invention is not limited to the present embodiment. Moreover, in the description of each drawing, the same constituent elements are referred to by the same reference numerals.

FIG. 1 is a schematic diagram of an overall configuration of an image processing system including the image processing device according to the present embodiment. As illustrated in FIG. 1, the image processing system includes a capsule endoscope 3, a receiving apparatus 5, and an image processing device 10. The capsule endoscope 3 captures images inside the body (intra-gastrointestinal-tract images) of a test subject 1. The receiving apparatus 5 receives the intra-gastrointestinal-tract images that are transmitted wirelessly by the capsule endoscope 3. Based on the intra-gastrointestinal-tract images received by the receiving apparatus 5, the image processing device 10 processes and displays the intra-gastrointestinal-tract images captured by the capsule endoscope 3. The communication of image data between the receiving apparatus 5 and the image processing device 10 is performed using, for example, a recording medium 7 that is portable (portable recording medium).

The capsule endoscope 3 that is equipped with the imaging functionality and the wireless communication functionality is introduced into the body of the test subject 1 by means of swallowing. Then, while moving through the gastrointestinal tract, the capsule endoscope 3 sequentially captures intra-gastrointestinal-tract images and wirelessly transmits them to the outside of the body.

The receiving apparatus 5 includes receiving antennas A1 to An arranged in a dispersed manner at positions on the body surface of the test subject 1 that correspond to the passage of the capsule endoscope 3 inside the body. Then, via the receiving antennas A1 to An, the receiving apparatus 5 receives the image data that is transmitted wirelessly by the capsule endoscope 3. The receiving apparatus 5 is configured to enable removable attachment of the portable recording medium 7 and iteratively stores the received image data in the portable recording medium 7. Thus, the series of intra-gastrointestinal-tract images that the capsule endoscope 3 captures inside the body of the test subject 1 is stored in temporal sequence in the portable recording medium 7 by the receiving apparatus 5.

The image processing device 10 is used by doctors to view/diagnose the series of intra-gastrointestinal-tract images captured by the capsule endoscope 3. The image processing device 10 can be put into practice using a general-purpose computer such as a workstation or a personal computer. Since the image processing device 10 is configured to enable removable attachment of the portable recording medium 7, it can process the series of intra-gastrointestinal-tract images stored in the portable recording medium 7 and sequentially display the processed images on a display such as a liquid crystal display (LCD) in temporal sequence.

Figure 2:
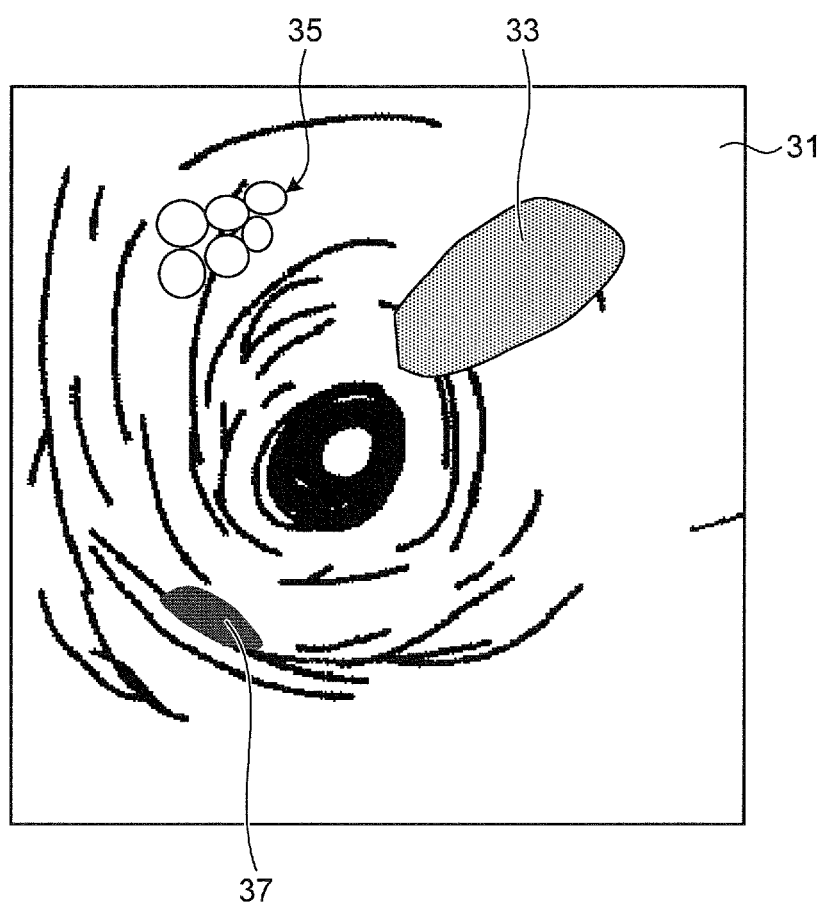
FIG. 2 is a schematic diagram of an exemplary intra-gastrointestinal-tract image.

FIG. 2 is a schematic diagram of an exemplary intra-gastrointestinal-tract image that is captured by the capsule endoscope 3 and processed by the image processing device 10. In each image of the series of intra-gastrointestinal-tract images primarily appears a mucous membrane 31 along with occasional appearances of gastrointestinal contents 33, bubbles 35, or a lesion 37. The image processing device 10 according to the present embodiment processes the series of intra-gastrointestinal-tract images and identifies, in each image, an area in which the mucous membrane appears (hereinafter, referred to as "mucosal area"). Meanwhile, generally, an intra-gastrointestinal-tract image captured by the capsule endoscope 3 is a color image possessing a pixel level (pixel value) with respect to each of the red (R), green (G), and blue (B) color components at each pixel position.

Figure 3:
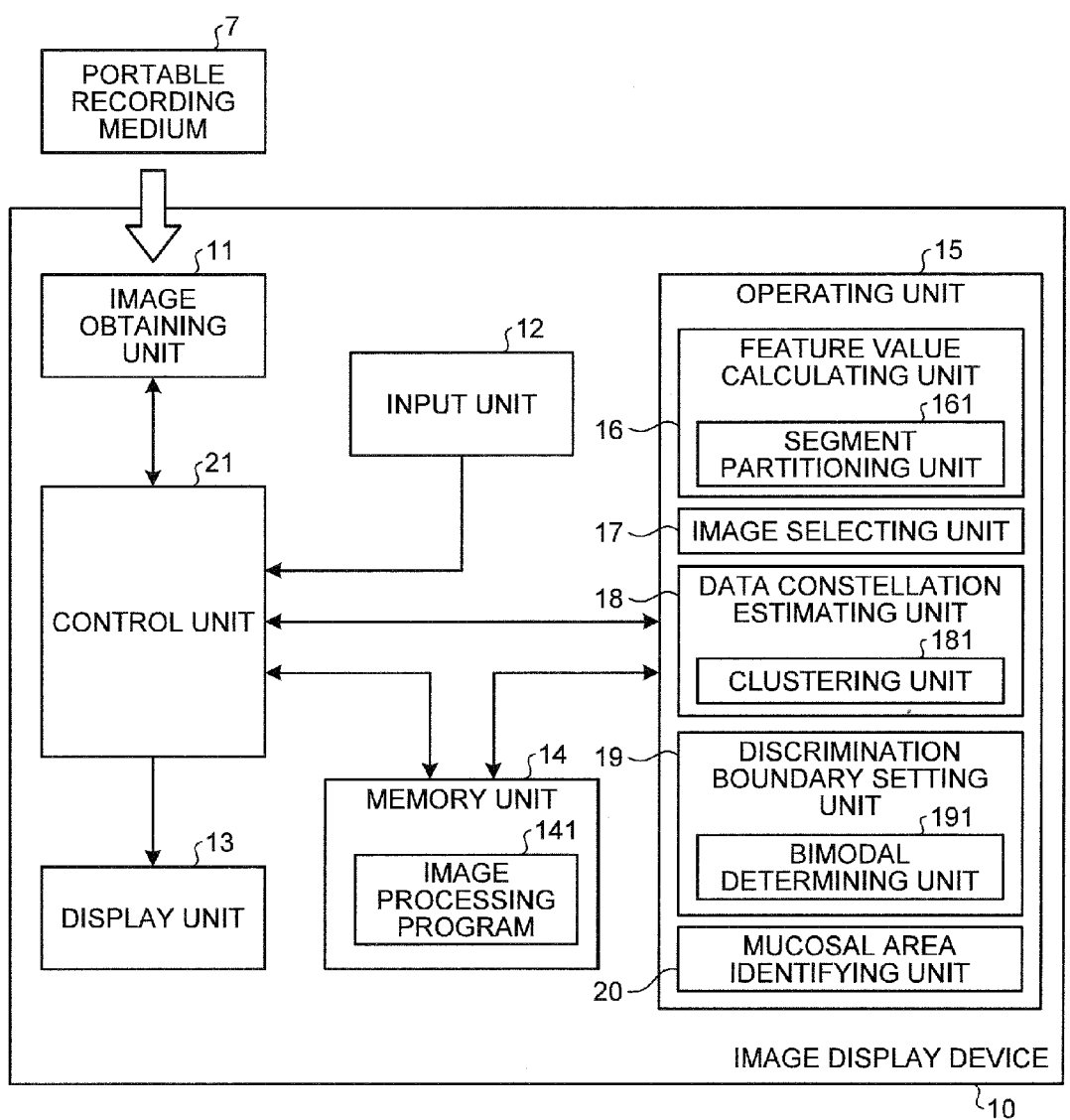
FIG. 3 is a block diagram of a functional configuration of the image processing device.

FIG. 3 is a block diagram of a functional configuration of the image processing device 10 according to the present embodiment. In the present embodiment, the image processing device 10 includes an image obtaining unit 11, an input unit 12, a display unit 13, a memory unit 14, an operating unit 15, and a control unit 21 that controls each component of the device.

The image obtaining unit 11 obtains the series of intra-gastrointestinal-tract images that has been captured by the capsule endoscope 3 and stored in the portable recording medium 7 by the receiving apparatus 5. More particularly, for example, the portable recording medium 7 is removably attached to the image processing device 10 so that the image obtaining unit 11 can read and obtain the image data of the intra-gastrointestinal-tract images stored in the portable recording medium 7. The image obtaining unit 11 is put into practice using, for example, a read-write device compatible to the type of the portable recording medium 7. Meanwhile, obtaining the series of intra-gastrointestinal-tract images captured by the capsule endoscope 3 is not limited to the configuration including the portable recording medium 7. For example, the image obtaining unit 11 can be replaced with a hard disk drive in which the series of intra-gastrointestinal-tract images captured by the capsule endoscope 3 can be stored in advance. Alternatively, a server can be installed instead of using the portable recording medium 7 and the series of intra-gastrointestinal-tract images can be stored in advance in that server. In that case, the image obtaining unit 11 is configured to be a communication device that is connected to the server. Thus, the image processing device 10 can connect with the server via the image obtaining unit 11 and obtain the intra-gastrointestinal-tract images from the server.

The input unit 12 is put into practice using, for example, a keyboard, a mouse, a touch-sensitive panel, and a variety of switches. In response to a manipulated input, the input unit 12 outputs a manipulation signal to the control unit 21. The display unit 13 is put into practice using a display device such as an LCD or an electro luminescent display (ELD) that, under the control of the control unit 21, displays a variety of screens including a display screen of intra-gastrointestinal-tract images.

The memory unit 14 is put into practice using an integrated circuit (IC) memory such as a read only memory (ROM) or a random access memory (RAM) of updatable flash memory type, an embedded hard disk drive or a hard disk drive connected to a data communication terminal, or an information recording medium such as a compact disk read only memory (CD-ROM) and a reading device to read information therefrom. The memory unit 14 is used to store a computer program that, when executed, operates the image processing device 10 and performs a variety of functions provided therein as well as store data required in the execution of the computer program. Besides, the memory unit 14 is used to store an image processing program 141 that is executed to identify the mucosal area inside each image of the series of intra-gastrointestinal-tract images.

The operating unit 15 is put into practice using hardware such as a central processing unit (CPU) that processes the series of intra-gastrointestinal-tract images obtained by the image obtaining unit 11 and performs various arithmetic processing to identify the mucosal area in each image. The operating unit 15 includes a feature value calculating unit 16, an image selecting unit 17, a data constellation estimating unit 18 as a color feature value estimating unit, a discrimination boundary setting unit 19, and a mucosal area identifying unit 20.

The feature value calculating unit 16 calculates a feature value of pixels or small segments in each image of the series of intra-gastrointestinal-tract images. The feature value calculating unit 16 includes a segment partitioning unit 161 that partitions each image into small segments. The image selecting unit 17 selects a plurality of images from the series of intra-gastrointestinal-tract images. The data constellation estimating unit 18 estimates, based on data distribution of a color feature value in the pixels or the small segments inside the images selected by the image selecting unit 17, a data constellation representing the mucous membrane (intestinal mucosa in the present embodiment) and the gastrointestinal contents. The data constellation estimating unit 18 includes a clustering unit 181 that performs clustering of the data distribution of the color feature value. The discrimination boundary setting unit 19 sets, based on the data constellation estimated by the data constellation estimating unit 18, a discrimination boundary for distinguishing between the color feature value of the mucous membrane and the color feature value of the gastrointestinal contents. The discrimination boundary setting unit 19 includes a bimodal determining unit 191 that determines the bimodal of a histogram in a color feature space of the data constellation estimated by the data constellation estimating unit 18. The mucosal area identifying unit 20 identifies, based on the discrimination boundary set by the discrimination boundary setting unit 19, the mucosal area in each image of the series of intra-gastrointestinal-tract images.

The control unit 21 is put into practice using hardware such as a CPU. Based on the image data input from the image obtaining unit 11, the manipulation signal input from the input unit 12, and the computer programs and data stored in the memory unit 14; the control unit 21 sends instructions to or transfers data to each constituent element of the image processing device 10 and intensively controls the overall operations of the image processing device 10.

Figure 4:
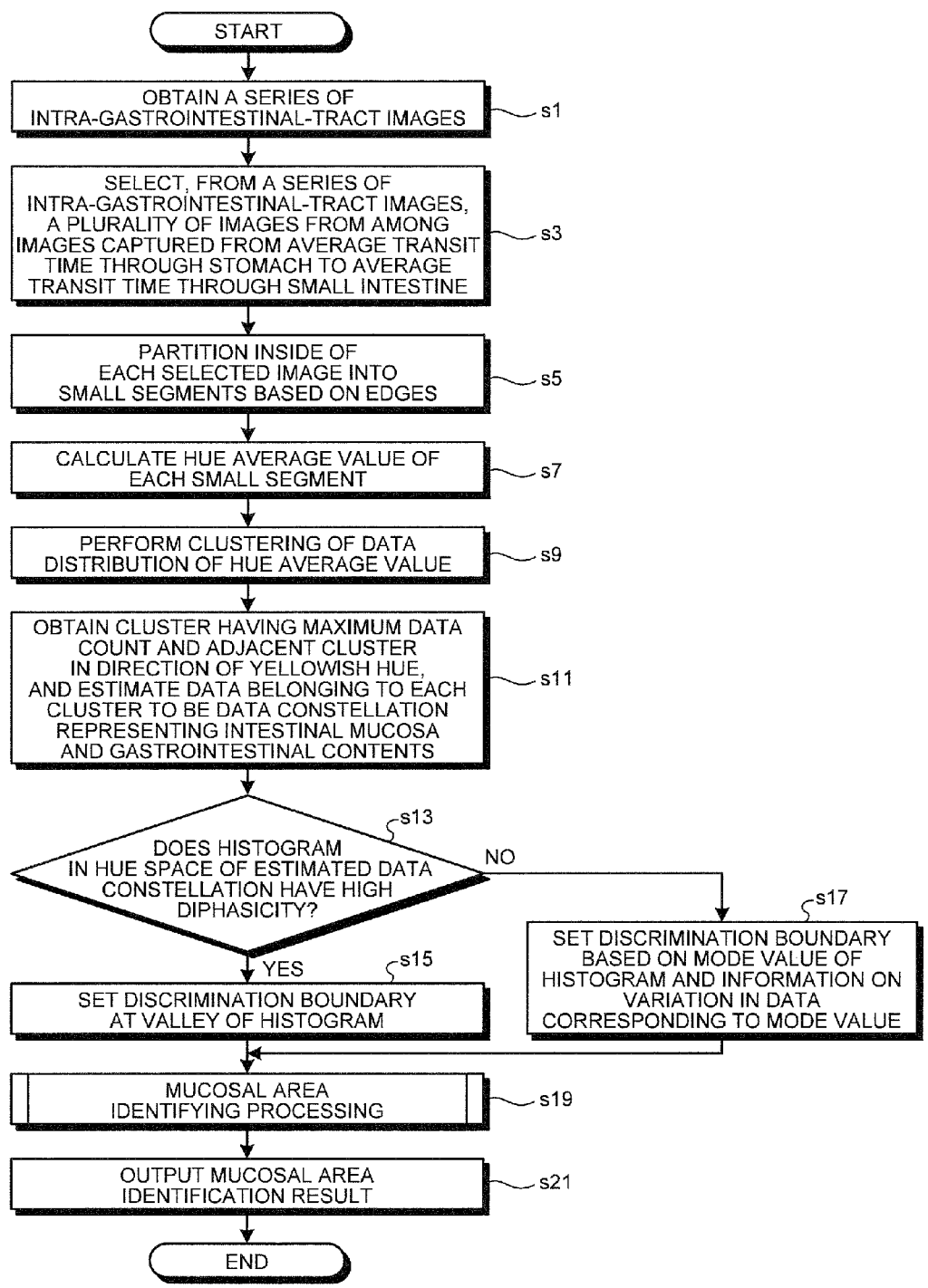
FIG. 4 is a flowchart of a sequence of operations performed by the image processing device.

FIG. 4 is a flowchart of a sequence of operations performed by the image processing device 10 according to the present embodiment. The operations explained below are performed when the operating unit 15 executes the image processing program 141 stored in the memory unit 14.

As illustrated in FIG. 4, first, the operating unit 15 obtains the series of intra-gastrointestinal-tract images (Step s1). That is, the operating unit 15 obtains via the control unit 21 the image data of each image of the series of intra-gastrointestinal-tract images that has been read and obtained by the image obtaining unit 11 from the portable recording medium 7. The image data of each image is stored in the memory unit 14 along with an image number indicating the temporal order of that particular image. Because of that, the image data of any image number can be retrieved.

Subsequently, from the series of intra-gastrointestinal-tract images, the image selecting unit 17 selects a plurality of images (selected images) from among the images captured during a period from the average transit time through the stomach to the average transit time through the small intestine (Step s3). The series of intra-gastrointestinal-tract images includes images of the oral cavity, the esophagus, the stomach, the small-intestine, and the large intestine in that order because the capsule endoscope 3 passes therethrough upon being swallowed. Since the capsule endoscope 3 passes rapidly through the oral cavity and the esophagus, only a small number of images are captured thereat. Thus, the images of the stomach, the small intestine, and the large intestine account for the majority of the images. Generally, as the longest internal organ in the body, the small intestine has the maximum number of images captured thereof. However, if the capsule endoscope 3 remains in the stomach without passing by the pylorus between the stomach and the small intestine, then the images of the gastric mucosa may increase in number. Similarly, if the capsule endoscope 3 passes through the large intestine at a slow speed along with the gastrointestinal contents (food residue), then the images of the gastrointestinal contents inside the large intestine may increase in number. In the processing described later, data of the color feature value in the intestinal mucosa in the gastrointestinal tract is estimated. Thus, it is preferable to have fewer images of the gastric mucosa or the gastrointestinal contents in the large intestine. Accordingly, in order to select images capturing more of the intestinal mucosa, images are selected at a predetermined interval (for example, an image after every 500 images), from among the images captured during a period from the average transit time through the stomach (about 40 minutes) to the average transit time through the small intestine (about 5 hours) taken by the capsule endoscope 3 upon being swallowed.

Meanwhile, as described above, the inside of the small intestine appears the most in the series of intra-gastrointestinal-tract images. Hence, it is also possible to select the images at a predetermined interval from among the entire section of the series of intra-gastrointestinal-tract images without limiting the section. Alternatively, it is also possible to select images at, for example, a predetermined interval from among the images captured after the average transit time taken by the capsule endoscope 3 to pass through the stomach. Still alternatively, it is also possible to select images at a predetermined interval from among the images captured before the average transit time taken by the capsule endoscope 3 to pass through the small intestine. Still alternatively, based on prior information such as the gastric resection information of the patient or the length of stay of the capsule endoscope 3 in the body, the images can be selected by limiting the section. For example, in the case of gastric resection, the selection of images can be performed using a suitable method such as limiting the section to a section shifted by the average transit time through the stomach or to a section at X % to Y % of the length of stay of the capsule endoscope 3 in the body.

Subsequently, the segment partitioning unit 161 partitions each of the plurality of selected images, which have been selected at Step s3, into small segments based on edges (Step s5). More particularly, the processing described below with respect to a single selected image is performed on all selected images so that each selected image is partitioned into small segments.

The processing with respect to a single selected image starts with the generation of a G-component image using the green (G) component of the selected image. Since the G-component has proximity to the absorbance spectrum of the blood, the use thereof enables clear representation of the structural information such as the mucosal architecture or the gastrointestinal contents boundary in an intra-gastrointestinal-tract image. However, alternatively, it is also possible to use other color components or use, for example, luminance or color difference (YCbCr conversion), hue, color saturation, brightness (HSI conversion), or color ratio calculated secondarily by known conversion processing. The G-component image is then subjected to spatial filtering with a first derivation filter (Prewitt filter, Sobel filter, etc.) or a secondary differentiation filter (Laplacian filter, Laplacian of Gaussian (LOG) filter, etc.) and an edge extraction image is obtained (reference: Computer Graphics Arts Society, digital image processing, 114P, edge extraction).

Then, on the basis of the edge extraction image, the segment partitioning unit 161 partitions the selected image into small segments. As a method for image segmentation based on the edge extraction image, it is possible to implement the method disclosed in, for example, WO2006/080239. A brief explanation of that method is as follows. First, the edge extraction image is subjected to smoothing processing for noise removal as necessary. Subsequently, the gradient direction of the pixel value in each pixel of the edge extraction image is obtained. Herein, the gradient direction is assumed to be the direction in which the difference in pixel values of proximity pixels is minimum (negative value is maximum). For each pixel, an extreme value pixel is obtained to which the pixel reaches along the gradient direction of the corresponding pixel value. Then, the image is partitioned in such a way that the pixels reaching adjacent extreme values are placed in the same segment. In this way, the image is partitioned into small segments on the basis of edges.

Alternatively, as another method of segmentation, it is possible to implement a watershed algorithm (reference: Luc Vincent and Pierre Soille. Watersheds in digital spaces: An efficient algorithm based on immersion simulations. Transactions on Pattern Analysis and Machine Intelligence, Vol. 13, No. 6, pp. 583-598, June 1991). The watershed algorithm is a method of segmenting an image in such a way that, when the pixel value information of an image is interpreted as elevation information and the topology of the image is flooded with water, boundaries are formed between the water accumulated in different sinkholes. For that reason, by performing the watershed algorithm after performing suitable smoothing processing with respect to the edge extraction image, an image partitioning result is obtained that is equivalent to the method disclosed in WO2006/080239.

Herein, the methods for partitioning an image into small segments based on edges are given for the purpose of reducing the effect of isolative pixel noise or the purpose of obtaining high-quality data at a latter stage by means of segment partitioning along the boundaries of the mucous membrane or the gastrointestinal contents. However, alternatively, it is also possible to implement a method by which the image is partitioned into rectangular segments of a particular size. In that case, edge extraction or edge-based segment partition is no longer required and the processing time can be reduced. Still alternatively, without performing segment partitioning, the processing at a latter stage performed by the feature value calculating unit 16 can be carried out on the pixels. In that case, the segment partitioning unit 161 can be removed and the device configuration can be simplified.

Referring to FIG. 4, the feature value calculating unit 16 calculates a hue average value of each small segment (Step s7). For that, first, the feature value calculating unit 16 calculates an R average value, a G average value, and a B average value in each small segment based on an R value, a G value, and a B value of each pixel inside that small segment. Then, based on the R, G, and B average values, the feature value calculating unit 16 calculates the hue average value in that small segment using known HSI conversion (reference: Computer Graphics Arts Society, digital image processing, 64P, HSI conversion and inverse conversion). The reason for calculating the hue average value is as follows. Because of the difference in the light absorption characteristics of the blood and the light absorption characteristics of the bile as the respective components of the mucous membrane and the gastrointestinal contents, it is possible to identify the mucous membrane or the gastrointestinal contents to some extent using a color feature value such as the hue. In essence, the hue for the gastric mucosa, the intestinal mucosa, and the gastrointestinal contents changes in that order from reddish hue to yellowish hue. Meanwhile, the hue average value is calculated for each small segment in all of the selected images.

In the method described above, HSI conversion is performed based on the R, G, and B average values of a small segment and the hue average value of that small segment is calculated. Alternatively, it is possible to perform HSI conversion based on the R, G, and B values of each pixel in a small segment and calculate the hue for each pixel. Then, based on those values, the hue average value of the small segment can be calculated. Meanwhile, it is also possible to calculate an average value of a color feature value other than the hue such as the color difference or the color ratio.

Subsequently, the clustering unit 181 performs clustering of the data distribution of the hue average value calculated at Step s7 for each small segment in each selected image (Step s9). The clustering technique is a method of dividing the data distribution within the feature space into blocks known as clusters on the basis of inter-data similarity. Clustering can be performed using known clustering techniques such as the hierarchical clustering or the k-means clustering (reference: Computer Graphics Arts Society, digital image processing, 231P, clustering). Meanwhile, herein, the feature space is assumed to be a one-dimensional hue space. As described above, clustering can be performed using various methods. However, since the processing at a latter stage is performed using a histogram of data in the hue space, the following description is given for a clustering technique based on a histogram of data.

Figure 5:
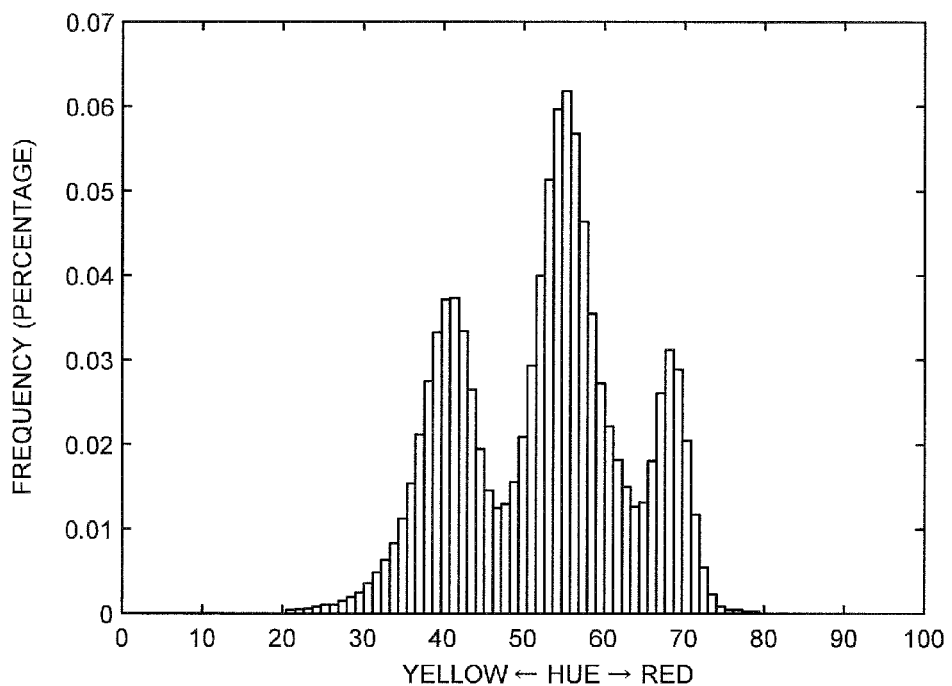
FIG. 5 is a graph of a calculation example of a histogram.

In the clustering technique based on a histogram of data, first, a histogram is calculated by plotting the class interval on the horizontal axis and plotting the frequency of the small segment that has the hue average value corresponding to the class interval on the vertical axis. Herein, the class interval is set by dividing a hue range that ranges from yellowish hue to reddish hue and that adequately includes the hue distribution range in the intra-gastrointestinal-tract images at a predetermined interval set in advance. FIG. 5 is a graph of a calculation example of the histogram. In the histogram illustrated in FIG. 5, normalization is performed so that the summation of frequency is equal to one.

Figure 6:
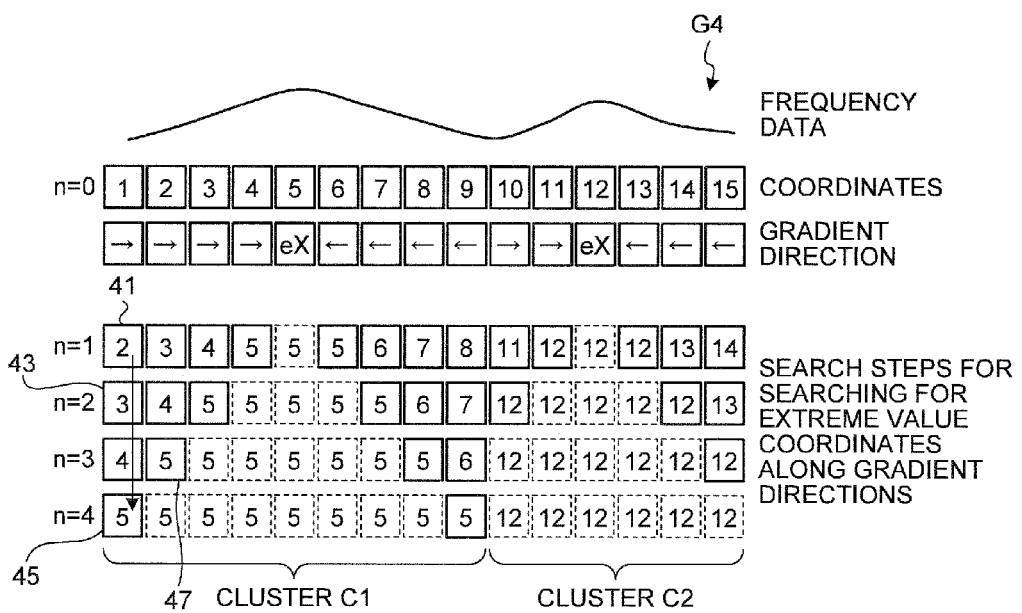
FIG. 6 is an explanatory diagram for explaining the principle of cluster classification.

Upon calculating the histogram, data distribution is divided into clusters with valleys in the histogram as boundaries. FIG. 6 is an explanatory diagram for explaining the principle of clustering performed in the present embodiment. In FIG. 6, frequency data G4 represents, in a simplified form, the changes in frequency of the histogram by a polygonal line. The coordinates given beneath the frequency data G4 represent, for descriptive purposes, the class interval of the histogram. The gradient direction is obtained from the difference between the frequency of a coordinate of interest and the frequencies of coordinates adjacent to the coordinate of interest. The gradient direction represents the direction in which the values of frequency increase the most. Meanwhile, the coordinates referred to by "eX" are extreme value coordinates having a higher frequency than any corresponding adjacent coordinate.

At the time of cluster classification, first the gradient direction is obtained. For example, assume that a coordinate "3" is the coordinate of interest. In that case, as illustrated in the frequency data G4, a coordinate "4" happens to be the coordinate that is adjacent to the coordinate of interest "3" in the direction in which the frequency increases the most with respect to the frequency of the coordinate of interest "3".

Thus, the direction along the right-pointing arrows in FIG. 6 (→) is set as the gradient direction of the coordinate of interest "3".

Upon obtaining the gradient directions of all coordinates, each coordinate is set as the starting point and an extreme value coordinate is searched along the corresponding gradient direction. The changes in the searched-for coordinates at the time of searching for the extreme value coordinates are referred to as "search steps for searching for extreme value coordinates along gradient directions" in FIG. 6. As an example, the following description is given regarding the search steps when a coordinate "1" is set as the starting point. At the location of the coordinate "1", the gradient direction is in the rightward direction. Thus, at the first search step (n=1), a coordinate "2" (referred to by a reference numeral 41) is obtained as the adjacent coordinate on the right side of the coordinate "1". The gradient direction at the location of the coordinate "2" is also in the rightward direction. Hence, at the second search step (n=2), the coordinate "3" (referred to by a reference numeral 43) is obtained as the adjacent coordinate on the right side of the coordinate "2". In this way, by sequentially continuing the search along the gradient directions, eventually (at n=4) a coordinate "5" (referred to by a reference numeral 45) is reached as the extreme value coordinate. In an identical manner, performing the search steps with the coordinate "2" as the starting point eventually (at n=3) leads to the coordinate "5" (referred to by a reference numeral 47) as the extreme value coordinate. When the search steps are performed with each coordinate as the starting point, then the coordinates "1" to "9" end up at the coordinate "5" as the extreme coordinate value and the coordinates "10" to "15" end up at a coordinate "12" as the extreme coordinate value. Thus, the coordinates "1" to "9" can be grouped into a first cluster C1 and the coordinates "10" to "15" can be grouped into a second cluster C2. In this way, cluster classification can be performed with a valley (between the class represented by the coordinate "9" and the class represented by the coordinate "10" in FIG. 6) in the histogram as the boundary.

FIG. 7 is a graph representing the result of clustering performed with respect to the histogram illustrated in FIG. 5 using the abovementioned method. In FIG. 7, it can be seen that three clusters C11, C13, and C15 are formed with valleys in the histogram as the boundaries.

Meanwhile, in order to limit the number of clusters at the time of clustering, changes can be made to the class interval width in the histogram or the histogram can be subjected to smoothing processing.

Referring to FIG. 4, the data constellation estimating unit 18 obtains the cluster having the maximum data count and the adjacent cluster in the direction of the yellowish hue, and estimates that the data belonging to each of those two clusters is the data constellation representing the intestinal mucosa and the gastrointestinal contents (Step s11). Since the intestinal mucosa appears the most in the selected images, the data constellation estimating unit 18 calculates the data count belonging to each cluster and estimates that the cluster having the maximum data count is the cluster containing hue average value data of the small segments in which the intestinal mucosa appears (hereinafter, referred to as "intestinal mucosa cluster"). In FIG. 7, the cluster C13 corresponds to the cluster having the maximum data count and is estimated to be the intestinal mucosa cluster. Meanwhile, because of the difference between the light absorption characteristics of the bile and the light absorption characteristics of the blood, the gastrointestinal contents appear more yellowish than the mucous membrane. Hence, the data constellation estimating unit 18 estimates that the cluster adjacent to the intestinal mucosa cluster in the direction of the yellowish hue is the cluster containing hue average value data of the small segments in which the gastrointestinal contents appear (hereinafter, referred to as "gastrointestinal contents cluster"). On the hue axis (horizontal axis) in FIG. 7, the hue goes on becoming more yellowish toward the left side. Thus, the cluster C11 corresponds to the adjacent cluster on the left side of the cluster C13 and is estimated to be the gastrointestinal contents cluster. Meanwhile, if no cluster has more yellowish hue than the intestinal mucosa cluster and the gastrointestinal contents cluster, then the data constellation estimating unit 18 estimates that the data belonging to the intestinal mucosa cluster is the data constellation representing the intestinal mucosa and the gastrointestinal contents. Moreover, the cluster C15 can be estimated to be the cluster containing hue average value data of the small segments in which appears the gastric mucosa having more reddish hue than the intestinal mucosa. Upon estimating the intestinal mucosa cluster and the gastrointestinal contents cluster, the data constellation estimating unit 18 estimates that the data belonging to those clusters is the data constellation representing the intestinal mucosa and the gastrointestinal contents.

Herein, the method is given for estimating the data constellation representing the intestinal mucosa and the gastrointestinal contents with the use of the hue space. Alternatively, it is also possible to estimate the data constellation representing the intestinal mucosa and the gastrointestinal contents by performing an identical processing with the use of another color feature value. That is, by using another color feature value, it is possible to estimate the cluster having the maximum data count to be the intestinal mucosa cluster and then estimate the cluster adjacent to the intestinal mucosa cluster in the direction of the yellowish hue within the range of that color feature value to be the gastrointestinal contents cluster.

Referring to FIG. 4, the bimodal determining unit 191 determines whether the histogram in the hue space of the data constellation estimated at Step s11 has a high bimodal (Step s13). Regarding bimodal determination of the histogram, given below is a method in which the histogram is divided into two classes, that is, divided in two distributions and the bimodal is determined on the basis of a bimodal determining indicator E obtained by dividing an inter-class dispersion $\sigma_b$ by a total dispersion $\sigma_t$.

First, the inter-class dispersion $\sigma_b$ is calculated according to Equation (1) given below. In Equation (1), $w_1$ represents the data percentage of a class 1, $m_1$ represents the data average value of the class 1, $w_2$ represents the data percentage of a class 2, $m_2$ represents the data average value of the class 2, and $m_t$ represents the total data average value.

$$\sigma_b = w_1 \times (m_1 - m_t)^2 + w_2 \times (m_2 - m_t)^2 \tag{1}$$

For example, the data constellation estimating unit 18 considers the data belonging to the gastrointestinal contents cluster as the data of a cluster 1 and considers the data belonging to the intestinal mucosa cluster as the data of a cluster 2, and accordingly calculates the inter-class dispersion $\sigma_b$. When the gastrointestinal contents cluster is not present, the histogram is determined to have a low bimodal.

Alternatively, it is also possible to implement a method in which a procedure of dual-partitioning the histogram in the hue space of the estimated data constellation using an arbitrary hue threshold value, setting the data belonging to one of the histograms as the data of the cluster 1, setting the data belonging to the other histogram as the data of the cluster 2, and calculating the maximum inter-class dispersion $\sigma_b$ is repeated for a plurality of times with different threshold values and the maximum inter-class dispersion $\sigma_b$ is obtained.

Subsequently, the total dispersion $\sigma_t$ is calculated according to Equation (2) given below. In Equation (2), N represents the total data count (data count of estimated data constellation) and $h_i$ represents the value of each data.

$$\sigma_t = \frac{1}{N}\sum_{i=1}^{N}(h_i - m_t)^2 \quad (2)$$

Then, the bimodal determining indicator E is calculated according to Equation (3) given below.

$$E = \frac{\sigma_b}{\sigma_t} \quad (3)$$

If the calculated value of the bimodal determining indicator E is equal to or more than a predetermined threshold value, then the histogram is determined to have a high bimodal. On the other hand, if the calculated value of the bimodal determining indicator E is less than the threshold value, then the histogram is determined to have a low bimodal.

Subsequently, according to the determined bimodal of the histogram, the discrimination boundary setting unit 19 performs setting processing and sets a discrimination boundary for distinguishing between the mucous membrane and the gastrointestinal contents. That is, as illustrated in FIG. 4; when the bimodal is determined to be high (Yes at Step s13), the discrimination boundary setting unit 19 sets a valley of the histogram as the discrimination boundary (Step s15). In the present embodiment, in the processing performed at abovementioned Steps s9 and s11, the clustering unit 181 divides the data distribution into clusters with a valley in the histogram as the boundary and the data constellation estimating unit 18 estimates the intestinal mucosa cluster and the gastrointestinal contents cluster. For that reason, the boundary between the intestinal mucosa cluster and the gastrointestinal contents cluster corresponds to the valley in the histogram. Thus, that boundary is set as the discrimination boundary for distinguishing between the color feature value of the intestinal mucosa cluster and the color feature value of the gastrointestinal contents cluster. For example, in the example illustrated in FIG. 7, a discrimination boundary B11 represented by a dashed-dotted line is set at which the histogram is determined to have a high bimodal.

Alternatively, it is also possible to calculate in an exploratory manner a hue threshold value that maximizes the interclass dispersion $\sigma_b$ given in abovementioned Equation (1) and set it as the discrimination boundary.

Meanwhile, as illustrated in FIG. 4; when the bimodal is determined to be low (No at Step s13), the discrimination boundary setting unit 19 sets a discrimination boundary on the basis of the mode value of the histogram and the information on variation in data corresponding to the mode value (Step s17). FIG. 8 is a graph of an exemplary histogram determined to have a low bimodal. In FIG. 8, the data belonging to clusters C21 and C23 is estimated to be the data constellation representing the intestinal mucosa and the gastrointestinal contents. However, the data distribution of the gastrointestinal contents is small as compared to the data distribution of the intestinal mucosa. Moreover, the two data distributions are in proximity. Because of that, at Step s13, the histogram is determined to have a low bimodal. In that case, first, a mode value $m_o$ of the histogram is calculated by obtaining the hue value corresponding to the class of highest frequency. Then, variation information $\sigma_h$ is calculated according to Equation (4) given below using an estimated data constellation $h_j$ (j=1 to N', N' representing data count) that is distributed in the reddish hue range than the mode value $m_o$.

$$\sigma_h = \sqrt{\frac{1}{N'}\sum_{j=1}^{N'}(h_j - m_o)^2} \quad (4)$$

Herein, making use of the mode value enables obtaining, in a mixed distribution of the intestinal mucosa and the gastrointestinal contents, a hue close to the center of the actual intestinal mucosa distribution. However, instead of using the mode value, it is also possible to use another representative value such as the median value or the average value. Herein, the reason for using data distributed in the reddish hue range than the mode value is that the variation information about variation in the hue distribution of the intestinal mucosa can be obtained without getting affected by the distribution of the gastrointestinal contents. Meanwhile, in the processing performed by the data constellation estimating unit 18; the distribution of the gastric mucosa, which is distributed in more reddish hue than the intestinal mucosa, often gets eliminated. Moreover, even if the distribution of the gastric mucosa is not eliminated, the calculation of the variation information is not considerably affected.

Upon obtaining the mode value $m_o$ and the variation information $\sigma_h$, a hue that is spaced apart by "K×$\sigma_h$" from the mode value $m_o$ on the yellowish hue side is set as the discrimination boundary for distinguishing between the color feature value of the mucous membrane and the color feature value of the gastrointestinal contents. Herein, K represents a predetermined coefficient set in advance. For example, in the example illustrated in FIG. 8, a discrimination boundary B21 represented by a dashed-dotted line is set based on a mode value D21.

Referring to FIG. 4, the mucosal area identifying unit 20 performs mucosal area identifying processing and identifies the mucosal area in each image of the series of intra-gastrointestinal-tract images (Step s19). FIG. 9 is a flowchart for explaining a detailed sequence of operations in the mucosal area identifying processing.

In the mucosal area identifying processing, first, the mucosal area identifying unit 20 sets an image number I of the target image for mucosal area identification to an image number I_start, which represents the image number of the first image of the series of intra-gastrointestinal-tract images (Step s191). Then, the mucosal area identifying unit 20 partitions the image corresponding to the image number I into small segments based on edges (Step s192). The partitioning into segments is performed in an identical manner to the processing performed with respect to the selected images at Step s5 in FIG. 4. Subsequently, the mucosal area identifying unit 20 calculates the hue average value of each small segment (Step s193). The calculation of hue average values is performed in an identical manner to the processing performed at Step s7 in FIG. 4.

Then, based on the hue average value of each small segment and the discrimination boundary, the mucosal area identifying unit 20 identifies which small segment is a mucosal area (Step s194). To identify which small segment is a mucosal area, the mucosal area identifying unit 20 compares the hue average value of each small segment with the hue at the discrimination boundary set by the discrimination boundary setting unit 19. Upon performing the mucosal area identification for all small segments in the image corresponding to the image number I, the mucosal area identifying unit 20 determines whether the image number I is equal to or smaller than an end image number I_end in the series of intra-gastrointestinal-tract images (Step s195). If the identification result indicates YES, it is determined that there exists a non-processed image, resulting in I=I+1 (Step s196), and then Steps s192 to s195 for another target image for mucosal area identification are performed. On the other hand, if the identification result indicates NO, it is determined that all images in the series of intra-gastrointestinal-tract images are processed. Thus the mucosal area identifying processing is completed, that is, the process returns to Step s19 in FIG. 4. Then, the system control proceeds to Step s21.

At Step s21 in FIG. 4, the operating unit 15 outputs the mucosal area identification result for the series of intra-gastrointestinal-tract images, which marks the end of the processing performed by the operating unit 15 in the image display device 10. For example, the operating unit 15 performs imaging with respect to the mucosal area identification result in each image of the series of intra-gastrointestinal-tract images and displays the images on the display unit 13 via the control unit 21.

As described above, according to the present embodiment, a series of intra-gastrointestinal-tract images captured inside the gastrointestinal tract of a test subject are obtained. Then, based on the data distribution of a color feature value in each small segment inside each of a plurality of selected images selected from the series of intra-gastrointestinal-tract images, a data constellation representing the intestinal mucosa and the gastrointestinal contents can be estimated. Subsequently, based on the estimated data constellation, it becomes possible to set, in an adaptive manner according to the test subject, a discrimination boundary for distinguishing between the color feature value of the mucous membrane and the color feature value of the gastrointestinal contents. The discrimination boundary can then be used in identifying the mucosal area inside each image of the series of intra-gastrointestinal-tract images. Thus, with respect to a series of intra-gastrointestinal-tract images captured inside the gastrointestinal tract of various test subjects, it is possible to identify the mucosal area in a stable manner.

According to an aspect of the present invention, a color feature value is calculated in each pixel or each segment inside at least some of the images in a series of intra-gastrointestinal-tract images captured by an image pickup device while moving inside the gastrointestinal tract of a test subject. Based on the data distribution of the color feature value, it becomes possible to estimate color feature value data representing the mucous membrane and color feature value data representing the gastrointestinal contents. Besides, based on the color feature value data, it is possible to set a discrimination boundary for distinguishing between the color feature value of the mucous membrane and the color feature value of the gastrointestinal contents. Thus, with respect to a series of intra-gastrointestinal-tract images captured inside the gastrointestinal tract of various test subjects, it is possible to identify the mucosal area in a stable manner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   a feature value calculating unit that calculates a color feature value of each pixel or each segment inside at least one of a series of images captured by an image pickup device while moving inside a gastrointestinal tract;
   a color feature value estimating unit that, based on data distribution of the color feature value of each pixel or each segment, estimates color feature value data representing mucous membrane and color feature value data representing gastrointestinal contents;
   a discrimination boundary setting unit that, based on the estimated color feature value data, sets a color feature value discrimination boundary between mucous membrane and gastrointestinal contents;
   a mucosal area identifying unit that identifies a mucosal area in at least one of the series of intra-gastrointestinal-tract images, using the set color feature value discrimination boundary between the mucous membrane and the gastrointestinal contents; and
   an image selecting unit that selects a plurality of images from the series of images captured by the image pickup device while moving inside the gastrointestinal tract, wherein
   the feature value calculating unit calculates the color feature value of each pixel or each segment inside the selected plurality of images.

2. The image processing device according to claim 1, wherein the color feature value estimating unit includes a clustering unit for dividing the color feature value data into clusters, estimates that a cluster having maximum count of color feature value data is the color feature value data representing mucous membrane, and estimates that a cluster that has a relative position thereof with the cluster having maximum count of color feature value data within a predetermined range in a color feature space is the color feature value data representing gastrointestinal contents.

3. The image processing device according to claim 1, wherein the discrimination boundary setting unit includes a bimodal determining unit for determining bimodal of a histogram in a color feature space of the color feature value data estimated by the color feature value estimating unit, performs setting processing according to a determination result of the bimodal determining unit, and sets the color feature value discrimination boundary between the mucous membrane and the gastrointestinal contents.

4. The image processing device according to claim 3, wherein, when the bimodal determining unit determines that the histogram has a high bimodal, then the discrimination boundary setting unit performs, as the setting processing, setting of a position of a valley in the histogram as the color feature value discrimination boundary between the mucous membrane and the gastrointestinal contents.

5. The image processing device according to claim 3, wherein, when the bimodal determining unit determines that the histogram has a low bimodal, then the discrimination boundary setting unit performs, as the setting processing, setting of the color feature value discrimination boundary between the mucous membrane and the gastrointestinal contents based on a representative value of the histogram and information on variation in color feature value data corresponding to the representative value.

6. The image processing device according to claim 1, wherein the color feature value estimating unit estimates that color feature value data representing intestinal mucosa is the color feature value data representing mucous membrane.

7. The image processing device according to claim 1, wherein the image selecting unit selects, from the series of images, a plurality of images from among images captured after an average transit time taken by the image pickup device to pass through stomach.

8. The image processing device according to claim 1, wherein the image selecting unit selects, from the series of images, a plurality of images from among images captured before an average transit time taken by the image pickup device to pass through small intestine.

9. The image processing device according to claim 1, wherein the color feature value is hue.

10. The image processing device according to claim 1, wherein the feature value calculating unit includes a segment partitioning unit for partitioning each image of the series of images captured inside the gastrointestinal tract into segments and calculates a color feature value of each segment partitioned by the segment partitioning unit.

11. A non-transitory computer readable storage medium having stored therein an image processing program, the image processing program comprising instructions for causing a computer to execute:

calculating a color feature value of each pixel or each segment inside at least one of a series of images captured by an image pickup device while moving inside a gastrointestinal tract;

estimating, based on data distribution of the color feature value of each pixel or each segment, color feature value data representing mucous membrane and color feature value data representing gastrointestinal contents;

setting, based on the estimated color feature value data, a color feature value discrimination boundary between mucous membrane and gastrointestinal contents; and identifying a mucosal area in at least one of the series of intra-gastrointestinal-tract images, using the set color feature value discrimination boundary between the mucous membrane and the gastrointestinal contents; and selecting a plurality of images from the series of images captured by the image pickup device while moving inside the gastrointestinal tract, wherein the calculating a color feature value comprises calculating the color feature value of each pixel or each segment inside the selected plurality of images.

12. An image processing method comprising:

calculating, using an image processing device, a color feature value of each pixel or each segment inside at least one of a series of images captured by an image pickup device while moving inside a gastrointestinal tract;

estimating, based on data distribution of the color feature value of each pixel or each segment, color feature value data representing mucous membrane and color feature value data representing gastrointestinal contents;

setting, based on estimated color feature value data, a color feature value discrimination boundary between mucous membrane and gastrointestinal contents; and identifying a mucosal area in at least one of the series of intra-gastrointestinal-tract images, using the set color feature value discrimination boundary between the mucous membrane and the gastrointestinal contents; and selecting a plurality of images from the series of images captured by the image pickup device while moving inside the gastrointestinal tract, wherein the calculating a color feature value comprises calculating the color feature value of each pixel or each segment inside the selected plurality of images.

\* \* \* \* \*